United States Patent [19]
Reid

[11] Patent Number: 4,791,409
[45] Date of Patent: Dec. 13, 1988

[54] SECURITY SYSTEM FOR ELECTRICAL APPLIANCES AND OTHER ITEMS WITH ELECTRICAL CIRCUITRY

[76] Inventor: Philip L. Reid, Rte. 2, Box 422, Duncan, S.C. 29334

[21] Appl. No.: 37,701

[22] Filed: Apr. 13, 1987

[51] Int. Cl.⁴ .............................................. G08B 13/22
[52] U.S. Cl. ............................... 340/539; 340/825.72; 340/825.76
[58] Field of Search ...................... 340/825.76, 825.72, 340/539

[56] References Cited

U.S. PATENT DOCUMENTS 4,023,138  5/1977  Ballin ................................. 340/539

Primary Examiner—Glen R. Swann, III
Attorney, Agent, or Firm—Bailey & Hardaway

[57] ABSTRACT

A security system for household appliances includes a signal source operating within a zone about the household. A receiver within the household appliances receives the signal and permits operability of the apparatus when the signal is received but which disables the appliance upon removal from the zone and away from the signal source.

3 Claims, 1 Drawing Sheet

SECURITY SYSTEM FOR ELECTRICAL APPLIANCES AND OTHER ITEMS WITH ELECTRICAL CIRCUITRY

BACKGROUND OF THE INVENTION

This invention relates generally to a security system for the deterrence of theft of electrical appliances or other property with electrical circuitry and more particularly to a security system which deters by limiting the operability of electrical appliances to the perimeters of a specified zone.

Various security systems exist within the prior art for the prevention of theft of property. One such system is disclosed in U.S. Pat. No. 4,559,529 to Bernhardt in which radio signals are transmitted to protect monitored articles. An audible alarm is triggered if an improper code is received. U.S. Pat. No. 3,710,371 to Whalen et al discloses a system which employs a mercury switch to energize an alarm, and the systems disclosed in U.S. Pat. Nos. 4,284,983 to Lent and 3,836,901 to Matto et al sound alarms if there is unauthorized disconnection of the monitored appliance and the appliance is moved from its original position. In addition, security systems disclosed in U.S. Pat. Nos. 3,794,989 to Manley et al and 3,484,775 to Cline trigger alarms when a monitored appliance is disconnected, and U.S. Pat. Nos. 4,573,042 to Boyd et al and 4,136,338 to Antenore disclose systems which sound alarms when physical parameters have been exceeded by a monitored appliance.

While the prior art provides various security systems for designated articles, there exists a need for a theft prevention system for electrical items with an effective deterrent alternative.

SUMMARY OF THE INVENTION

It is thus an object of this invention to provide a novel security system for electrical appliances or other items with electrical circuitry whereby a monitored item's operability is dependent upon its presence within the parameters of a specified zone of operation.

It is a further object of this invention to provide an inexpensive security system which does not require professional assistance to install.

These as well as other objects are accomplished by a security system for electrical appliances and other items with electrical circuitry comprising a signal source emitting a coded signal, frequency or pulse within a specified zone and a receiver for such signal, attached to the electrical circuitry of the monitored device, which renders the device operable inside the zone and inoperable otherwise.

DETAILED DESCRIPTION

In accordance with this invention, it has been found that a security system for electrical appliances and other items with electrical circuitry to be herein described may be employed to deter the unauthorized removal of a monitored item from its intended place of operation. The security system of this invention is comprised of two principal parts, a signal source and a signal detector. The signal source, which may be either stationary or portable, emits a signal in all directions within the parameters of a specified zone. The receiver or power detector is attached to the electrical circuitry of the monitored item. When the detector receives the properly coded emissions from the source, the monitored item remains operable. Outside the specified zone, however, the emitted signals are not received by the detector, causing the circuitry of the electrical appliance to be altered, rendering the device inoperable. Thus, an article monitored by the system of this invention would be of no value to one unauthorized to remove it from its zone of operation. Other advantages and features will be apparent from the following description and reference to the various figures of drawing.

Figure 1:
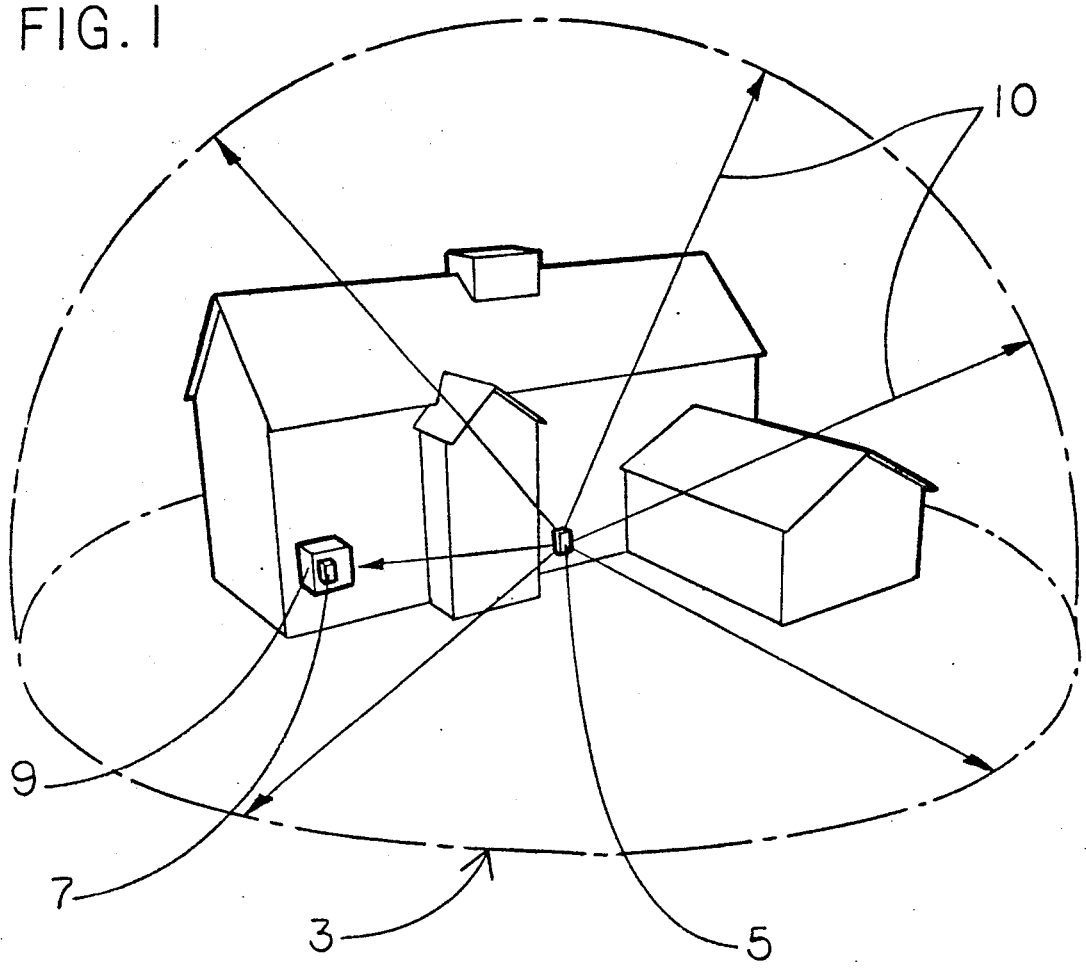
FIG. 1 of the drawings illustrates the relative positions within a specified zone of a stationary energy source and an energy detector attached to a monitored article in accordance with this invention.

FIG. 1 of the drawings illustrates in accordance with this invention the relative positions within a specified zone 3 of a stationary signal source 5 and a power detection device 7 attached to the electrical circuitry of a monitored article 9. The physical and electrical properties of the detector 7 are conformed with the physical and electrical properties of article 9 at the time of installation. The signal source 5 is placed in an obscure location within the subscribed's house, such that monitored household articles, as, for example, article 9, are positioned within the parameters of the associated zone 3. Sonic, infrared or microwave emissions 10, coded in ways well known in the art, continually radiate from the signal source 5 and are received by one or more detectors 7 positioned in one or more monitored articles 9.

Article 9 remains operable in the presence of the coded emissions 10 since the detector is receiving the frequency it is programmed to receive. As article 9 is removed from the specified zone 3, the detector 7 no longer receives the required signal and a switching mechanism within the detector 7 is activated, altering the electrical circuitry of the monitored article 9 in ways known in the art. Thus, article 9 is rendered inoperable. For switching apparatus responsive to electromagnetic or sonic sources, the teachings of the following U.S. Patents are hereby incorporated by reference: U.S. Pat. Nos. 3,189,000 to Salners; 3,165,090 to Smith; 3,157,152 to Rieth; 3,133,269 to Cotsworth; and 2,902,604 to Baldwin.

Figure 2:
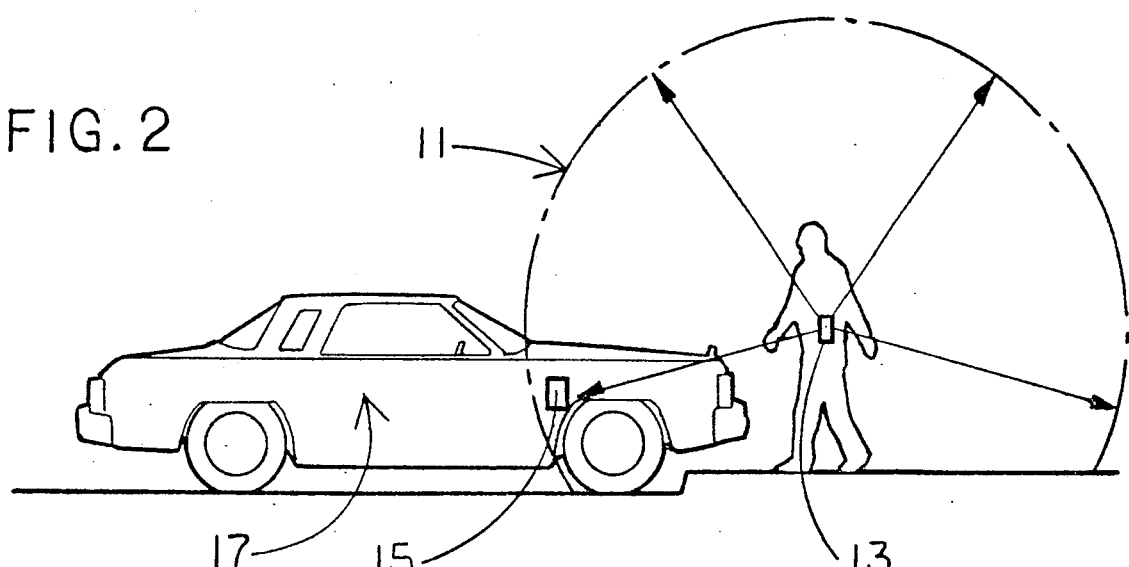
FIG. 2 of the drawings illustrates the relative positions vis-a-vis a specified zone of a portable energy source and an energy detector attached to a monitored article in accordance with this invention.

FIG. 2 of the drawings illustrates in accordance with this invention the relative positions vis-a-vis a specified zone 11 of a portable signal source 13 and a signal detector 15 attached to a monitored article 17. A portable signal source 13 is required in monitoring articles such as a car, boat, motorcycle or airplane since, during the time of normal operation, these items are mobile and would exceed the prescribed zone associated with a stationary energy source. The portable source 13 allows proper operation of the monitored device when it is worn or carried by the operator of the device. When the authorized operator carrying the portable source leaves the premises or vicinity of the monitored device, the device is rendered inoperable.

An additional embodiment of the security system in accordance with this invention allows the energizing of an alarm circuit by a second switching mechanism as the monitored article exceeds the parameters of the prescribed zone. Thus, not only is the article rendered inoperable, but its removal from the subscriber's home is signaled by an audible alarm. Although the installation of the security system does not require professional assistance, the expertise of the security agency is required to effect a change in the status of the security system. Both dismantling the system and resetting it once dismantled involve the assistance of the security agency, further insuring the continued security of the protected articles.

One important aspect of the security system in accordance with this invention herein described is an awareness program to advertise the system to potential subscribers and to educate persons unauthorized to remove a subscriber's property from its zone of operation about the operability of the system. The program includes supplying notices of the implemented system to a subscriber for use on house and/or grounds as well as on each protected article.

It is thus seen that the security system described herein is a novel and effective means of deterring unauthorized removal of electrical appliances or other items with electrical circuitry from their intended locations. Further, the instant invention is noteworthy in that it is not limited to one type of energy wave for its operation.

As variations of the instant invention will be apparent to one of skill in the art from a reading of the above specifications, such variations are within the spirit and scope of this invention as defined by the following appended claims:

That which is claimed is:

1. A security system for electrical household appliances having electrical circuitry, comprising:
   a signal source emitting a coded signal within a specified zone about said household; and
   a receiver for said emitted signal attached to the electrical circuitry of said appliance to render said appliance operable inside said specified zone and inoperable outside said zone.

2. The security system for electrical appliances in accordance with claim 1 further comprising means for triggering an audible alarm within said appliance when said appliance is outside of said zone.

3. The security system for electrical appliances in accordance with claim 1 wherein said emitted coded signal comprises sonic wave, infrared wave and/or microwave transmissions

* * * * *